United States Patent [19]

Swadling et al.

[11] 4,351,470
[45] Sep. 28, 1982

[54] METHOD OF MAKING A STIFFENED PANEL

[75] Inventors: Martin H. Mansbridge, Filton, England

[73] Assignee: British Aerospace Public Limited Company, London, England

[21] Appl. No.: 279,610

[22] Filed: Jul. 1, 1981

Related U.S. Application Data

[63] Continuation of Ser. No. 78,582, Sep. 21, 1979, abandoned.

[30] Foreign Application Priority Data

Sep. 29, 1978 [GB] United Kingdom .............. 38659/78

[51] Int. Cl.³ ..................... B23K 28/02; B21D 26/02
[52] U.S. Cl. .......................... 228/157; 219/121 ED; 228/190; 228/193; 228/265
[58] Field of Search .............. 228/157, 190, 265, 193, 228/173 C; 219/121 ED

[56] References Cited

U.S. PATENT DOCUMENTS

| | | | |
|---|---|---|---|
| 3,458,683 | 7/1969 | Canonico et al. | 219/121 ED |
| 3,924,793 | 12/1975 | Summers et al. | 228/157 |
| 4,217,397 | 8/1980 | Hayase et al. | 228/157 X |

FOREIGN PATENT DOCUMENTS

| | | | |
|---|---|---|---|
| 54-9132 | 1/1979 | Japan | 219/121 ED |
| 438254 | 11/1935 | United Kingdom . | |
| 784112 | 10/1957 | United Kingdom . | |
| 804636 | 11/1958 | United Kingdom . | |
| 843824 | 8/1960 | United Kingdom . | |
| 905490 | 9/1962 | United Kingdom . | |
| 1051962 | 12/1966 | United Kingdom . | |
| 1378421 | 12/1974 | United Kingdom . | |
| 1398929 | 6/1975 | United Kingdom . | |
| 1495655 | 12/1977 | United Kingdom . | |

*Primary Examiner*—Kenneth J. Ramsey
*Attorney, Agent, or Firm*—Cushman, Darby & Cushman

[57] ABSTRACT

Two face-to-face metal sheets, one or each of which is superplastically deformable, are subjected to a bonding and pressure deformation process in which the sheets are bonded together at a series of spaced positions thereon and the areas of the or each superplastically deformable sheet between these positions move away from the other sheet so that there is formed a series of cavities between the sheets, the sides of neighboring cavities being substantially adjacent to one another over substantial parts of their areas. These sides of the cavities, which are preferably substantially rectangular may come directly into contact with one another and be diffusion bonded together either directly or via reinforcing members.

2 Claims, 8 Drawing Figures

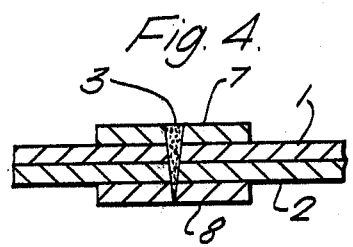
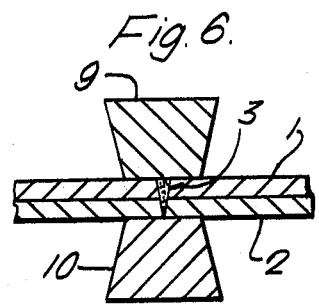
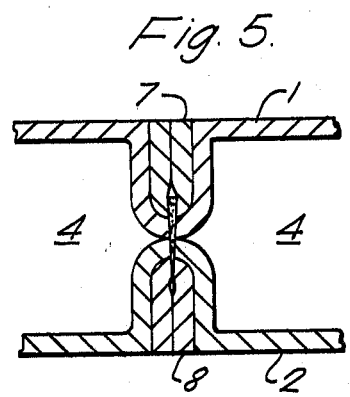
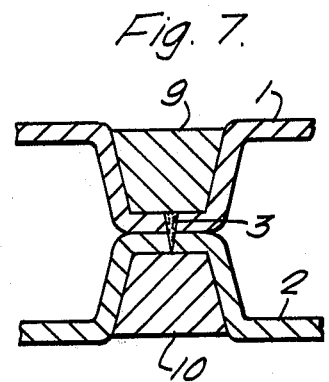
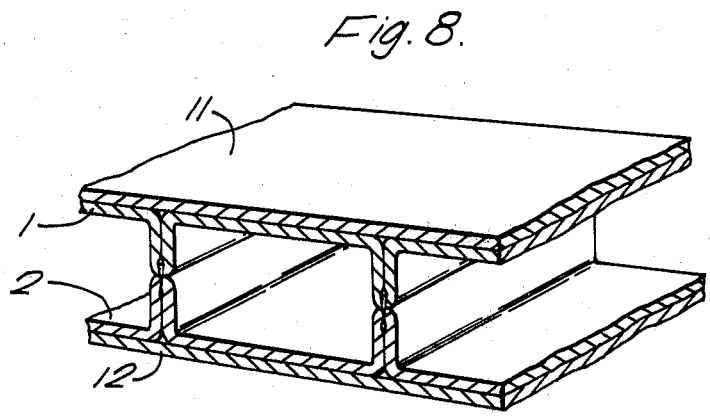

METHOD OF MAKING A STIFFENED PANEL

This is a continuation of application Ser. No. 78,582 filed Sept. 21, 1979, now abandoned.

This invention relates to a stiffened panel made from two metal sheets, at least one of which is superplastically deformable.

Metals having superplastic characteristics have a composition and micro-structure such that when heated to within an appropriate temperature range and when deformed with an appropriate range of strain rate they exhibit the flow characteristics of a viscous fluid. With such metals, large deformations are possible without fracture.

It is known from U.K. Patent No. 1,398,929 to make a stiffened panel by joining together two metal sheets, one or each of which is superplastically deformable, at spaced positions across the faces of the sheets and then pressure deforming the or each superplastically deformable sheet against a mould surface having a series of channels into which the sheet deforms so that it is left with a series of spaced corrugations bounding cavities between the sheets. It is also known, from U.S. Pat. No. 3,924,793 to make such a stiffened panel by placing a superplastically deformable metal sheet between two other metal sheets and joining them together across the faces thereof and then causing the two outer sheets to move apart, for example by the application of fluid pressure therebetween, so that the inner sheet is deformed and is left extending diagonally from one sheet to the other in alternate sequence.

Particularly with the technique disclosed in U.K. No. 1,398,929 difficulties are sometimes experienced with the tendency for the superplastic sheet to become locally thinned, and hence weakened, particularly at the corners of the mould channels.

It is an object of the invention to provide a method whereby there is formed a stiffened panel of which the non-deformed sheet is less likely to comprise this non-uniform, local thinning and which is more efficient i.e. which for the same amount of material is stronger, than panels made by the known process.

Further objects are to provide a panel wherein the deformed sheet presents a substantial continuous top or facing surface instead of one comprising widely spaced corrugations, and to provide a method wherein a simpler form of mould may be used than that of U.K. No. 1,398,929.

According to one aspect of the invention, there is provided a method of making a stiffened panel including subjecting two metal sheets, which are positioned face to face and of which at least one is superplastically deformable, to a bonding and deforming process during which the sheets are attached to one another at a series of spaced positions across the faces thereof and during which parts of said at least one sheet between said positions are superplastically deformed in a mould by the application of a differential pressure between the faces of this sheet and move away from the other sheet to form respective ones of a series of cavities between the two sheets, portions of said at least one sheet on respective sides of each of said positions having moved as aforesaid to form sidewalls of two neighbouring cavities and these sidewalls being substantially adjacent to one another over substantial parts of the areas thereof.

Advantageously, substantial parts of the sidewalls of the cavities are directly in contact with and/or attached (for example by diffusion bonding) to the adjacent sidewalls of the neighbouring cavities.

Diffusion bonding is a process which forms a metallurgical bond by the application of heat and pressure to metallic pieces held in close contact for a specific length of time. Bonding is thought to occur by the movement of atoms across adjacent faces of the pieces. The process allows metals to be joined without significantly changing their physical or metallurgical properties. The temperature ranges at which superplasticity and diffusion bonding occur may or may not be the same depending upon the material joined.

Preferably, the sheets are attached to one another at said positions and then said differential pressure is applied to effect said superplastic deformation.

The said other sheet may be superplastically deformable so that it becomes superplastically deformed by the application of said differential pressure during said process. Advantageously, the members are clamped around the periphery within said mould. The sheets may be attached to one another as aforesaid by welding them together along a series of spaced lines across the faces thereof. A further metal sheet may be attached to the or each superplastically deformable sheet.

According to another aspect of the invention there is provided a stiffened panel made by the method described above.

A preferred embodiment of the invention will now be described, by way of example only, with reference to the accompanying drawing, in which:

FIGS. 4 and 5 are cross-sectioned views illustrating respective stages in the manufacture of a stiffened panel comprising reinforcing strips, FIGS. 6 and 7 are cross-sectioned views illustrating respective stages in the manufacture of a stiffened panel comprising reinforcing bars, and FIG. 8 is a perspective view of part of a stiffened panel comprising outer facing sheets.

Figure 1:
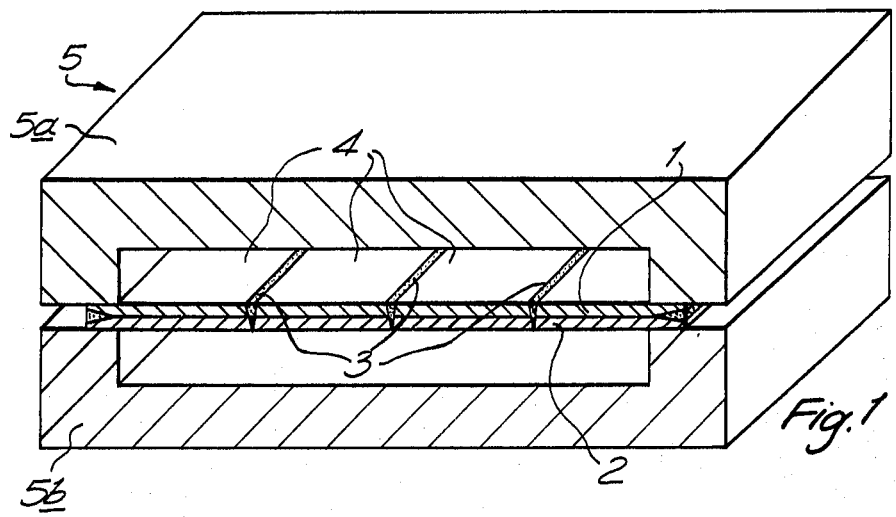
FIG. 1 shows in perspective a cross-sectional view of two metal sheets clamped within a forming mould within which superplastic deformation is to take place.

Referring now to FIG. 1, two face-to-face metal sheets 1, 2 both having superplastic characteristics and capable of being diffusion bonded are attached to one another by forming continuous, airtight welds around the edges of the sheets and along several other lines 3 forming enclosed neighbouring inflatable envelopes 4, the two sheets being clamped between the upper and lower members 5a, 5b respectively of a forming mould 5 into which superplastic deformation is to take place. The two metal sheets 1, 2 are made of an alloy of Titanium, Aluminium and Vanadium in the proportions Ti-6Al-4V. The thickness of each sheet will depend upon the eventual application of the stiffened panel. For some aircraft panel applications, a thickness of ½ to 1 m.m. has been found useful while 1 to 2 m.m. has been found to be useful for a number of other applications.

Other metals may be used instead of T1-6Al-4V but this particular metal is preferred since it is very suitable both for being superplastically deformed and for diffusion bonding and, also, these processes can both be made to occur within the same temperature range. The welding is preferably but not necessarily electron beam welding. Instead of welding, the sheets could be fixed together by some other means, for example by diffusion bonding.

Figure 2:
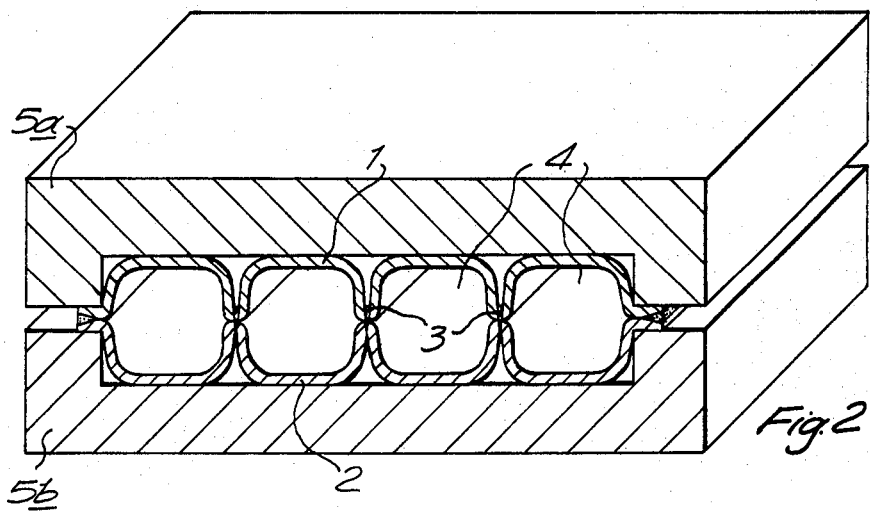
FIG. 2 shows an intermediate stage in the forming process.
Figure 3:
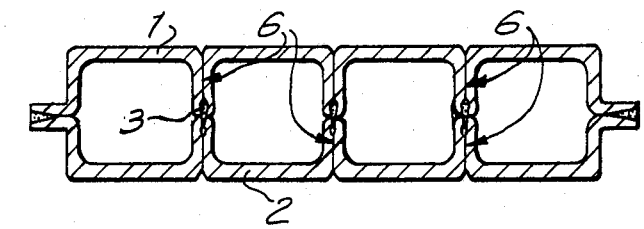
FIG. 3 is a cross-sectional representation of a formed structure.

The forming mould 5 and the two metal sheets 1 and 2 are heated to within a temperature range at which the sheets 1 and 2 exhibit superplastic characteristics. For Ti-6Al-4V the temperature range is approximately 920°–960° C. An inert gas, e.g. argon, is admitted under pressure into the envelopes 4 via inlet tubes (not shown) at a pressure up to about 200 lbs/sq. inch. This gradually causes the envelopes 4 to expand in balloon-like fashion, the envelopes thus becoming cavities. Expansion in this form continues until the metal sheets contact the upper and lower members of the forming mould, when the expanding metal, in the region of contact, takes on the flattened shape of the upper and lower mould members, the overall shape of each cavity becoming sausage-like in transverse cross-section as seen in FIG. 2. As pressurised gas is continued to be admitted the flattened surfaces of the sausage-shape grow to form a generally rectangular shape when neighbouring regions of the cavities forming the walls meet and press against one another and diffusion bonding occurs, the regions of diffusion bonding being referenced 6 in FIG. 3. The pressure within the cavities is maintained during the diffusion bonding process so as to keep the surfaces to be bonded in intimate contact. By way of example, it may take about 1½ hours for the deformation of the sheets to be completed and the pressure and temperature are maintained for about 2 hours after this in order to ensure proper diffusion bonding. The metal sheets 1 and 2 are then allowed to cool.

As shown in FIG. 4, respective reinforcing strips 7 and 8 may be fixed to the sheets 1 and 2 along each welding line 3 so as to form a sandwich structure with the sheets 1 and 2 between the strips 7 and 8. The strips 7 and 8 are made of superplastically deformable and diffusion bondable material like the sheets 1 and 2 and, during the deformation process, the edges of the strips bend inwards towards each other until they touch and are diffusion bonded together and to the walls of the cavities 4 as shown in FIG. 5.

In FIG. 6 respective solid reinforcing bars 9 and 10 of the same material as the sheets 1 and 2 are fixed to the outer faces of the sheets along each welding line 3 so that, during the deformation process, the sheets move into conformity with the sides of the bars and become joined, by diffusion bonding thereto.

As shown in FIG. 8, the panel structure may be provided with upper and lower facing sheets 11 and 12 which are diffusion bonded to the sheets 1 and 2. In order to make what is shown in FIG. 8, the sheets 11 and 12 could be laid against the outer faces of the sheets 1 and 2 within the mould 5 of FIG. 1 before the envelopes 4 are inflated. Then, however, since the sheets 11 and 12 would tend to become bonded to the sheets 1 and 2 before inflation is complete, the sheets 11 and 12 may become distorted. It is preferable, therefore, for the sheets 11 and 12 to be positioned against the upper and lower internal faces of the mould at the stage shown in FIG. 1, i.e. so that the sheets 1 and 2 only come into contact with the sheets 11 and 12 at a relatively later stage in the inflation process. If desired, only one of the two facing sheets 11 and 12 may be provided.

Instead of being straight as shown, the weld lines 3 may follow zig-zag or wavy paths across the sheets so as to give some increase in structural efficiency of the panel. Further, instead of having the weld lines generally running in one general direction across the sheet faces, the panel could be given additional strength in two directions by providing two sets of straight, wavy or zig-zag lines which cross each other and form a series of generally square or rectangular compartments with passageways therebetween to enable the inert gas to reach and inflate all of the compartments during the deformation stage. Also the upper and lower mould members 5a, 5b need not have flat surfaces or be disposed parallel to each other. Instead, the mould could be in the shape of some particular non-planar article to be manufactured, for example an aircraft wing part. Where such an article is to comprise the facing sheets 11 and 12 shown in FIG. 8, to avoid the aforementioned problem of deformation of the facing sheets, these are preferably superplastically deformed by the application of pressure into conformity with the mould surfaces first, and the envelopes of the core structure comprising the sheets 1 and 2 are only then inflated into contact with the sheets 11 and 12 and diffusion bonded thereto.

We claim:

1. In the method of making a stiffening panel which includes the steps of:

positioning in face-to-face relation two metal sheets at least one of which is superplastically deformable, attaching the sheets together along at least one line and about their peripheries to form at least one inflatable envelope; and inflating the envelope in a mold to superplastically deform the superplastically deformable sheet to form at least two cavities between the sheets separated by wall portions attached to each other along the attaching line, the improvement comprising the further steps of:

prior to the inflating step positioning a plastically deformable metal sheet reinforcing member against the outer surface of the plastically deformable sheet and along the line of attachment of the two sheets;

attaching the member to the plastically deformable sheet along the line of attachment of the two sheets, whereby the member is deformed with the plastically deformable sheet during the inflating step;

continuing the inflating step until portions of the member on opposite sides of the line of attachment meet in face-to-face relation;

bonding together the meeting portions of the member; and bonding together the opposed portions of the plastically deformable sheet and the member.

2. A method according to claim 1, wherein the superplastically deformable sheet and the reinforcing member are diffusion bondable and the meeting portions of the reinforcing member and the opposed portions of the sheet and the member are diffusion bonded together.

* * * * *

UNITED STATES PATENT AND TRADEMARK OFFICE
CERTIFICATE OF CORRECTION

PATENT NO. : 4,351,470
DATED : September 28, 1982
INVENTOR(S) : Martin H. Mansbridge It is certified that error appears in the above—identified patent and that said Letters Patent is hereby corrected as shown below:

Page 1, at top of page [45] - change "Swadling et al"

to -- Mansbridge --.

Signed and Sealed this

Fifteenth Day of February 1983

[SEAL]

Attest:

GERALD J. MOSSINGHOFF

Attesting Officer

Commissioner of Patents and Trademarks